(12) United States Patent
Elliot

(10) Patent No.: US 6,554,695 B2
(45) Date of Patent: Apr. 29, 2003

(54) DEVICE FOR RECYCLING AIR IN A VEHICLE CABIN

(75) Inventor: Gilles Elliot, Courcouronnes (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 10/134,736

(22) Filed: Apr. 30, 2002

(65) Prior Publication Data
US 2002/0164942 A1 Nov. 7, 2002

(30) Foreign Application Priority Data
May 4, 2001 (FR) ............................................. 01 05986

(51) Int. Cl.[7] .................................................. B60H 1/26
(52) U.S. Cl. ...................................... 454/139; 454/144
(58) Field of Search ............................. 454/100, 121, 454/139, 144

(56) References Cited

U.S. PATENT DOCUMENTS 5,486,138 A * 1/1996 Sorensen ...................... 454/75
6,332,330 B1 * 12/2001 Loup et al. .................... 62/244

FOREIGN PATENT DOCUMENTS

| EP | 0 645 267 A1 | 3/1995 |
| FR | 2 769 262 | 4/1999 |
| FR | 2 798 323 | 3/2001 |

* cited by examiner

Primary Examiner—Harold Joyce
(74) Attorney, Agent, or Firm—Liniak, Berenato & White

(57) ABSTRACT

The invention relates to a device for air-conditioning a cabin (3) of a motor vehicle, comprising an air-conditioning unit (5) installed in front of the dashboard (2), able to be supplied with external air and/or with recycled air taken from the cabin and passing through a recycling pipe (9) arranged in the dashboard (1), and able to deliver a flow of conditioned air to an air delivery pipe (18) connecting said unit (5) to the rear region (19) of the cabin (3), wherein there is provided, in the dashboard (1), a branch pipe (21) connecting said recycling pipe (9) to said delivery pipe (18), said branch pipe (21) dividing the delivery pipe (18) into an upstream portion (18b) situated between the unit (5) and the junction (23) with the branch pipe (21), and into a downstream portion (18a) situated between said junction (23) and the vent and, in said junction (23), a rear recycling shutter (22) able to adopt at least two positions, a first position (P1) in which it closes off the entrance (24) to the branch pipe (21), and a second position (P2) in which it closes off the exit (25) from the upstream portion (18a) of the delivery pipe (18) so as to allow air to be taken from the rear region (19) of the cabin (3) for recycling.

2 Claims, 2 Drawing Sheets

DEVICE FOR RECYCLING AIR IN A VEHICLE CABIN

The invention relates in general to an air-conditioning device for motor vehicles.

It relates more specifically to a device for air-conditioning a cabin of a motor vehicle, comprising an air-conditioning unit installed in front of the dashboard, able to be supplied with external air and/or with recycled air taken from the cabin and passing through a recycling pipe arranged in said dashboard, and able to deliver to the rear region and the cabin a flow of conditioned air through a delivery pipe connecting said unit to a vent.

Certain air-conditioning devices actually comprise a supply shutter which, in a particular position known as the recycling position, allows the vehicle cabin to be supplied in an closed or an almost closed circuit. This mode of operation is particularly used when the vehicle passes through polluted areas. This mode of operation is also useful in cold weather, when starting the vehicle, so as to allow the vehicle to warm up more quickly, and also when the external air is very hot, to allow energy savings. In almost all vehicles equipped with recycling means, the recycled air intake is arranged in the dashboard.

EP 0 645 267 describes an air-conditioning device for motor vehicles in which the recycled air intake is in the rear region of the cabin and the recycling pipe is arranged in part in the floor of the cabin. However, this device described in this document has no pipe for delivering conditioned air to the rear region of the cabin.

In vehicles which have an air vent in the rear region of the cabin, the corresponding air delivery pipe is generally arranged in the floor of the cabin and the air delivered flows from the conditioning unit to the vent.

The purpose of the invention is to propose a conditioning device such as mentioned in the introduction which makes it possible, on demand, to take recycled air from the rear region of the cabin.

According to the invention, the device is one wherein there is provided, in the dashboard, a branch pipe connecting said recycling pipe to said delivery pipe, said branch pipe dividing the delivery pipe into an upstream portion situated between the unit and the junction with the branch pipe, and into a downstream portion situated between said junction and the vent and, in said junction, a rear recycling shutter able to adopt at least two positions, a first position in which it closes off the entrance to the branch pipe, and a second position in which it closes off the exit from the upstream portion of the delivery pipe so as to allow air to be taken from the rear region of the cabin for recycling.

Thus, conditioned air from the unit flows into the downstream portion of the delivery pipe when the rear recycling shutter is in the first position, and air taken from the rear region of the cabin flows in the opposite direction in this downstream portion when the rear recycling shutter is in the second position.

Advantageously, the rear recycling shutter can adopt a third position in which it places the upstream portion in communication with the branch pipe.

This arrangement makes it possible, under extreme conditions, to inject colder or hotter air back into the recycling pipe in order to more quickly reduce or increase the temperature of the air leaving the vents provided in the dashboard.

Other advantages and features of the invention will become apparent from reading the following description which is given by way of example and with reference to the appended drawings in which.

Figure 1:
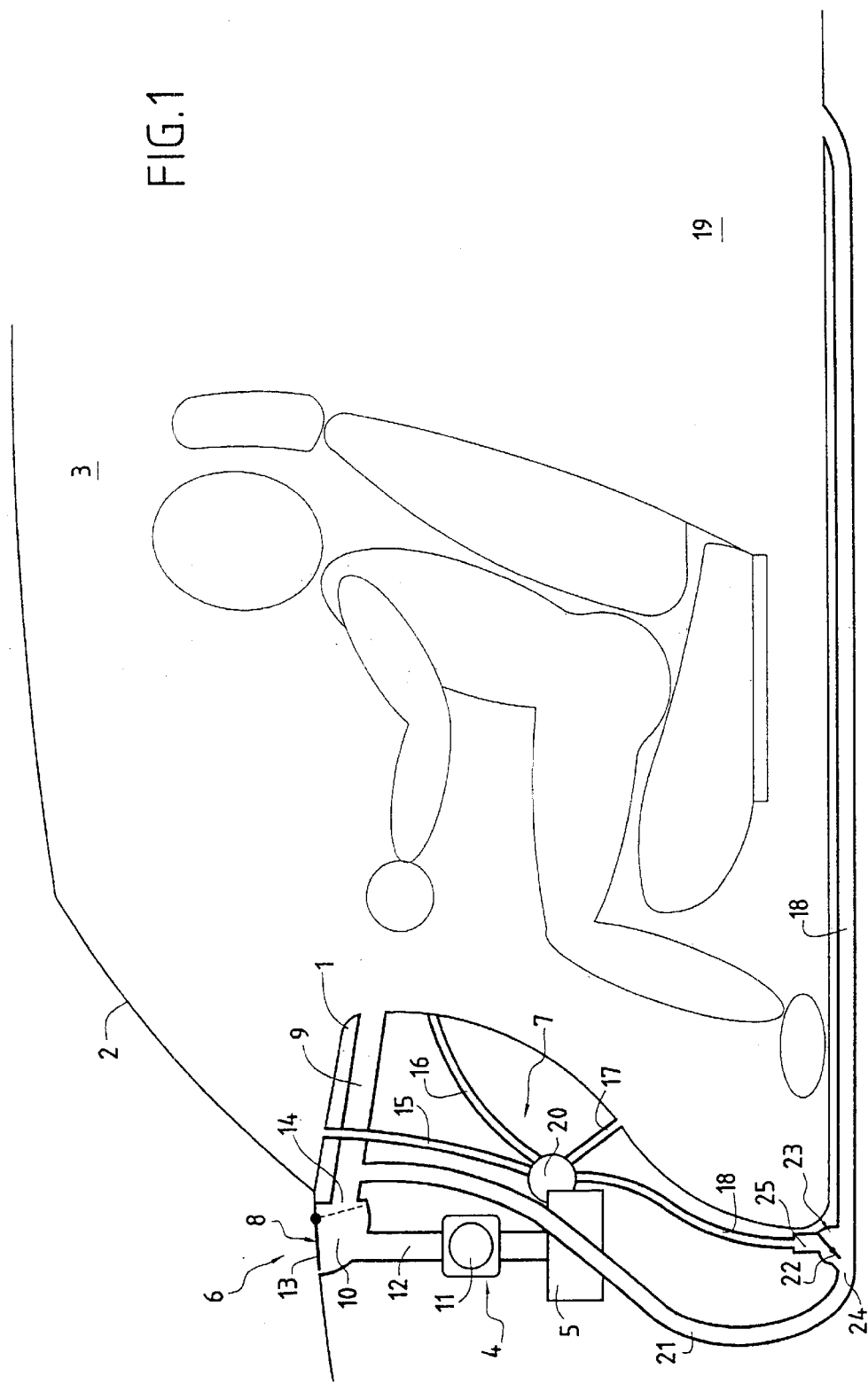
FIG. 1 is a longitudinal schematic section through the cabin and the dashboard of a motor vehicle equipped with an air-conditioning device according to the invention.

The reference 1 depicts a dashboard of a motor vehicle, which dashboard is set back from a windshield 2 and at the front of the cabin 3.

The vehicle is equipped with an air-conditioning device 4 which essentially comprises a conditioning unit 5 arranged in the dashboard 1, an air supply circuit 6 and a bundle 7 of pipes delivering air to the cabin 3. The air supply circuit 6 comprises an external-air intake 8, an air recycling pipe 9 arranged in the dashboard 1 and connecting the cabin 3 to an air inlet chamber 10 and an air induction device 11 arranged in an inlet pipe 12 between the chamber 10 and the conditioning unit 5. A distribution shutter 13 arranged in the inlet chamber 10 allows the supply of air to the induction device 11 to be controlled, the air coming either from the outside with air entering the inlet chamber 10 via the inlet 8, or coming from the cabin 3 via the recycling pipe 9. The distribution shutter is able to move between, on the one hand, a first position known as the open position in which it closes off the outlet 14 of the recycling pipe, so that practically all of the air entering the conditioning unit comes from outside and, on the other hand, a second position known as the closed position, in which it closes off the inlet 8, so that practically all of the air drawn in comes from the cabin 3 via the recycling pipe 9.

The bundle 7 of delivery pipes essentially comprises a defrosting pipe 15, a front ventilation pipe 16, a pipe 17 for heating or ventilating the front lower region of the cabin 3 and a pipe 18 for delivering conditioned air to the lower rear region 19 of the cabin 3.

These various pipes 15 to 18 are supplied selectively by a distribution box 20 of the conditioning unit 5.

Such a conditioning device is known and requires no further explanation.

According to the invention, a branch pipe 21 connects the delivery pipe 18 to the recycling pipe 9. A rear recycling shutter 22 is provided at the junction 23 between the branch pipe 21 and the delivery pipe 18. The delivery pipe 18 is thus divided into two pipe portions, namely an upstream portion 18a connecting the distribution box 20 to the junction 23 and a downstream portion 18b connecting the junction 23 to the rear region 19 of the cabin 3.

Figure 2:
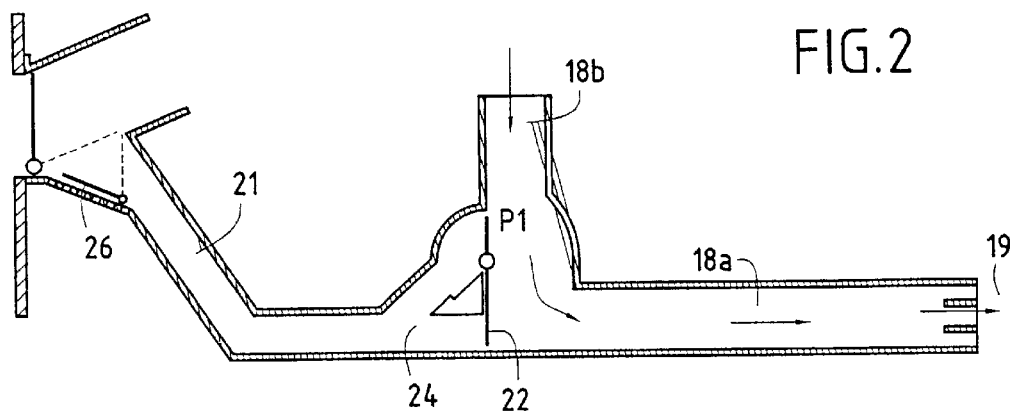
FIGS. 2 to 4 show the various positions that the rear recycling shutter of the conditioning device of FIG. 1 can adopt.
Figure 3:
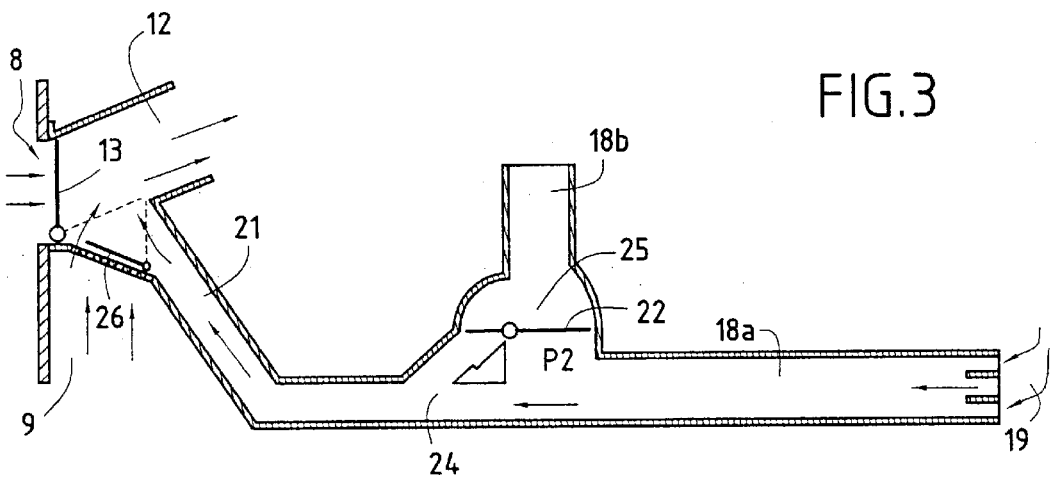
Figure 4:
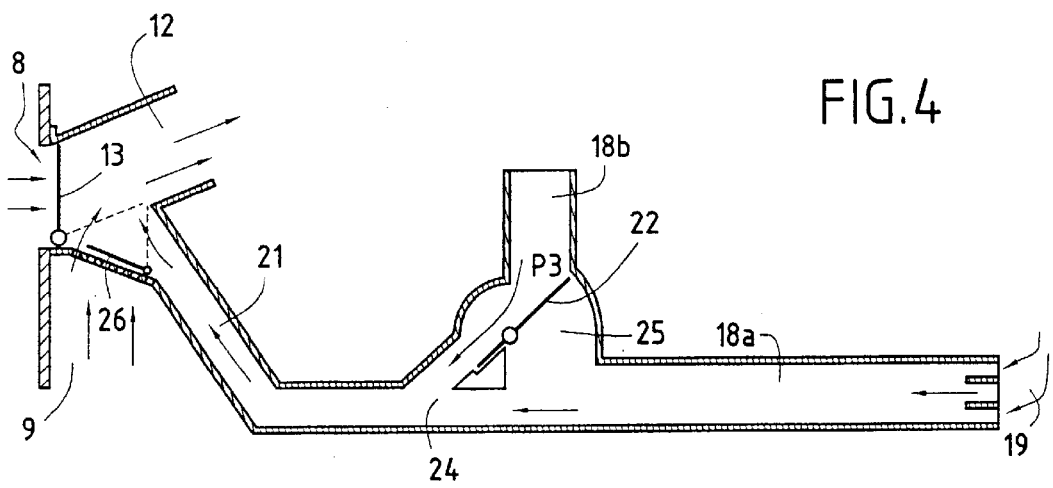

The recycling shutter 22 can adopt three positions as shown in FIGS. 2 to 4.

In the first position P1 shown in FIG. 2 the rear recycling shutter 22 shuts off the entry 24 to the branch pipe 21.

No air can pass through the branch pipe 21. The conditioned air delivered by the distribution box 20 to the delivery pipe 18 therefore comes out into the rear region 19 of the cabin 3.

In the second position P2 shown in FIG. 3, the rear recycling shutter 22 closes off the outlet 25 of the upstream portion 18a of the delivery pipe 18. The downstream portion 18b is therefore in communication with the recycling pipe 9 via the branch pipe 21. When the air induction device 11 is taking in recycled air via the recycling pipe 9, the distribution shutter 13 shutting off the external air inlet 8, at least some of the recycling air will be taken from the rear region 19 of the cabin 3.

In the third position P3 shown in FIG. 4, the rear recycling shutter 22 is positioned in such a way that the upstream portion 18a and the downstream portion 18b of the delivery pipe 18 are placed in communication with the branch pipe 21. In this position, the conditioned air delivered by the upstream portion 18a is entirely recycled by the air induction device 11.

The reference 26 denotes a recycled-air selection shutter arranged at the junction between the branch pipe 21 and the recycling pipe.

The selection shutter 26 and the recycling shutter 22 are operated by the same control button.

What is claimed is:

1. A device for air-conditioning a cabin of a motor vehicle, comprising an air-conditioning unit installed in front of the dashboard, able to be supplied with external air and/or with recycled air taken from the cabin and passing through a recycling pipe arranged in the dashboard, and able to deliver a flow of conditioned air to an air delivery pipe connecting said unit to the rear region of the cabin, wherein there is provided, in the dashboard, a branch pipe connecting said recycling pipe to said delivery pipe, said branch pipe dividing the delivery pipe into an upstream portion situated between the unit and the junction with the branch pipe, and into a downstream portion situated between said junction and the vent and, in said junction, a rear recycling shutter able to adopt at least two positions, a first position in which it closes off the entrance to the branch pipe, and a second position in which it closes off the exit from the upstream portion of the delivery pipe so as to allow air to be taken from the rear region of the cabin for recycling.

2. The device as claimed in claim 1, wherein the rear recycling shutter can adopt a third position in which it places the upstream portion in communication with the branch pipe.

* * * * *